United States Patent [19]

Nelson

[11] 4,312,445
[45] Jan. 26, 1982

[54] BELT CONVEYOR TANDEM DRIVE ASSEMBLY WITH GROUND LEVEL CLEAN-OUT CLEARANCE

[75] Inventor: Robert C. Nelson, Bluefield, W. Va.

[73] Assignee: Mining Machinery Development Corp., Daniels, W. Va.

[21] Appl. No.: 161,765

[22] Filed: Jun. 23, 1980

[51] Int. Cl.³ ...................... B65G 23/04; B65G 21/00
[52] U.S. Cl. ..................................... 198/835; 198/860
[58] Field of Search ............... 198/812, 828, 835, 860, 198/861, 862

[56] References Cited

U.S. PATENT DOCUMENTS 2,992,725 7/1961 Poundstone ......................... 198/835
3,107,004 10/1963 Arndt ............................. 198/862 X Primary Examiner—Joseph E. Valenza
Assistant Examiner—Paul A. Sobel
Attorney, Agent, or Firm—McCaleb, Lucas & Brugman

[57] ABSTRACT

A tandem drive assembly, sometimes called a drive or head section, for a belt conveyor having a pair of drive pulleys arranged in tandem, in which the main drive frame comprises separate, ground-engaging, foot members located respectively inbye and outbye of the drive pulleys, and a pair of longitudinal side members interconnecting the foot members. In the example illustrated, the side members are I-beams angularly inclined upwardly from the outbye foot member to the inbye foot member. The drive pulleys are rotatably journaled in bearings mounted on upper, angularly inclined surfaces of the side members to support the inbye drive pulley at a higher level than the outbye drive pulley. The lower surfaces of the side frames are likewise angularly inclined and provide ground level clearance through the sides of the main frame for access by a scoop or shovel to the area beneath the drive rollers where dust and fines are deposited by the conveyor belt.

3 Claims, 3 Drawing Figures

BELT CONVEYOR TANDEM DRIVE ASSEMBLY WITH GROUND LEVEL CLEAN-OUT CLEARANCE

BACKGROUND OF THE INVENTION

This invention relates generally to belt conveyors. More specifically, it relates to tandem drive assemblies for belt conveyors and particularly to those used in underground coal mines.

It is well known to those familiar with the use of belt conveyors in underground coal mines that coal dust and fines accumulate on the ground beneath the drive assemblies. Most of this collects in the area just beneath the drive pulleys. Coal dust is hazardous because it burns easily, and is violently explosive when agitated and suspended into the air. It is especially hazardous if allowed to accumulate under a belt conveyor drive assembly because several malfunctions possible with this equipment can create enough heat to ignite or explode the coal dust. The powerful electric drive motors can overheat under heavy, sustained loads. The belt can mis-align, rub against the drive frame and generate heat by friction. A troughing or return pulley can freeze up; and the resulting friction can quickly generate heat and sparks. Ventilating fans on the drive motors can suspend coal dust in air and bring it into contact with overheated parts.

Because of these dangers, coal dust accumulating around and under a conveyor drive should be cleaned out regularly. Unfortunately, head room restrictions require that belt conveyor drives be built low to the ground. As a result all conventional drives have side members or beams directly on the ground in the area flanking the tandem drive pulleys where most of the dust collects. It is not possible to remove this dust by inserting a scoop or shovel through the sides of the machine because there are no ground level openings large enough. Because of this, the conveyor must be stopped and someone has to reach in from the outbye end of the drive unit and drag the dust out lengthwise of the conveyor. This is awkward, slow and dirty work, and takes the conveyor out of production for an objectionably long time. This situation accordingly is in need of improvement.

SUMMARY OF THE INVENTION

Therefore, a principal object of the present invention is to provide a belt conveyor tandem drive assembly, sometimes called a drive or head section, which can be cleaned readily without stopping the conveyor for an extended length of time and without exposing mine maintenance personnel to the hazard of working beneath a moving belt.

Another object is to provide a belt conveyor tandem drive assembly which has ground level side openings in the main frame adjacent the drive pulleys, providing ready access to the ground area immediately beneath the drive pulleys, thereby making it easy to remove dust and fines deposited there by the conveyor belt.

An important feature is to provide an improved belt conveyor tandem drive assembly, or head section, in which the main frame has a pair of side members flanking a pair of tandem drive pulleys, a pair of separate, ground-engaging foot members located respectively inbye and outbye of the drive pulleys, the upper surfaces of the side members being inclined downwardly in the outbye direction to support the inbye drive pulley at a higher level than the outbye drive pulley, and the lower surfaces of the side members being similarly inclined above the ground to provide ground-level clearance openings in the sides of the main frame to permit insertion of a shovel or scoop for removal of dust and fines.

Further objects of the invention will appear as the description proceeds.

To accomplish the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures of the drawings are briefly described as follows.

DETAILED DESCRIPTION OF PREFERRED EMBODIMENT

Figure 1:
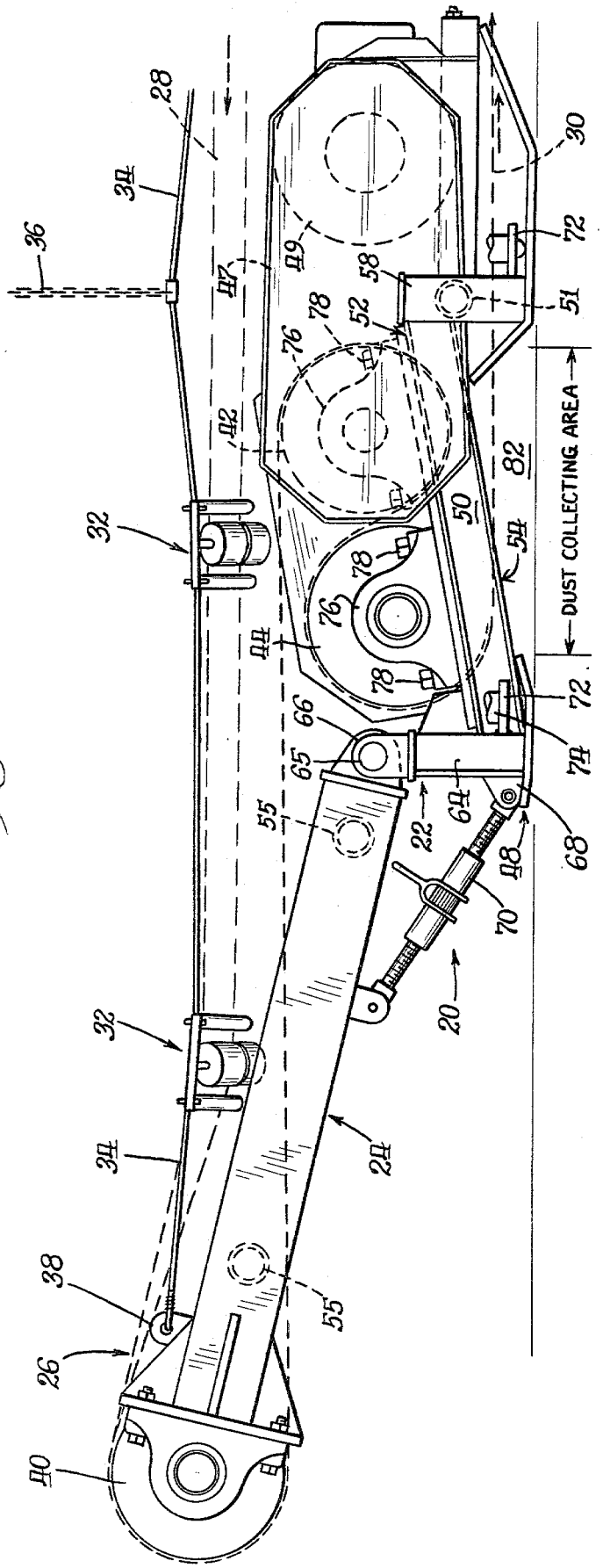
FIG. 1 is a side view of the belt conveyor tandem drive assembly.
Figure 2:
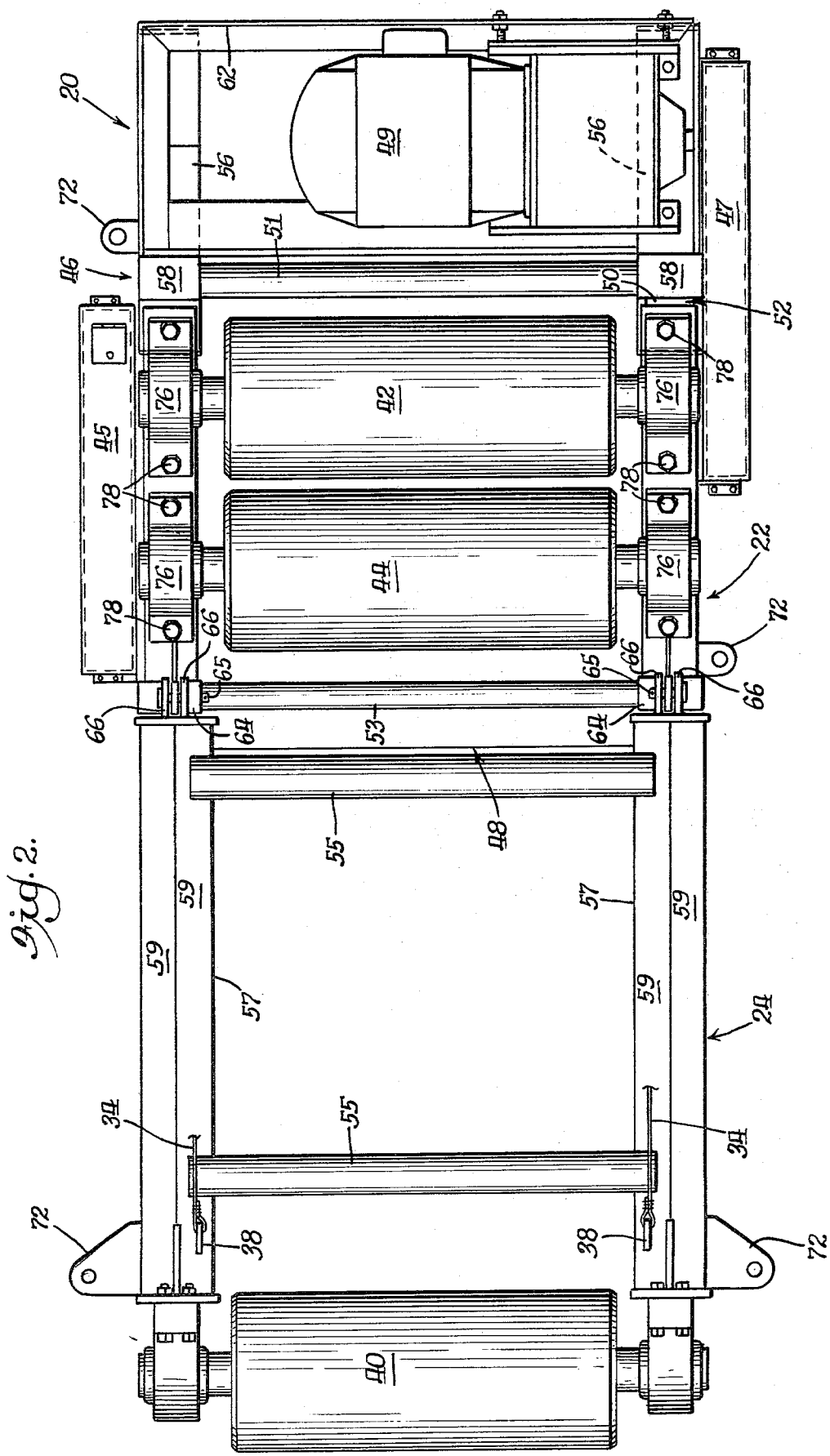
FIG. 2 is a top view of FIG. 1.

Referring now to the drawings in greater detail, the reference numeral 20 represents a belt conveyor tandem drive assembly, or head section, which may be used to transport coal within and out of an underground coal mine. Belt conveyors are well known in such applications, so this description will not include detailed descriptions of equipment and components familiar to miners.

Briefly, however, the tandem drive assembly 20 comprises a main frame 22 and a discharge boom 24. An orbitally movable, endless conveyor belt 26 (shown in broken lines in FIG. 1) is trained along a course in an upper, load-carrying run or reach 28, and a lower, return run or reach 30. These conveyor runs extend inbye (to the right in the drawings) toward a receiving or tail section (not shown). The conveying run is supported at intervals on troughing roller assemblies 32 carried on a pair of parallel wire ropes 34 suspended from chains 36. The outbye ends of the wire ropes are anchored on eyes 38 welded to the boom 24.

The belt 26 is trained about a direction-reversing pulley 40 at the outbye end of the boom. The return reach extends in an inbye direction from the pulley 40 to, and around, an inbye drive pulley 42, to and around an outbye drive pulley 44, and thence in an inbye direction toward the tail section (not shown). The drive pulleys are interconnected by spur gears in a gear case 45 and are driven by a suitable electrical gear motor 49 through a chain and sprockets in a chain drive case 47.

Figure 3:
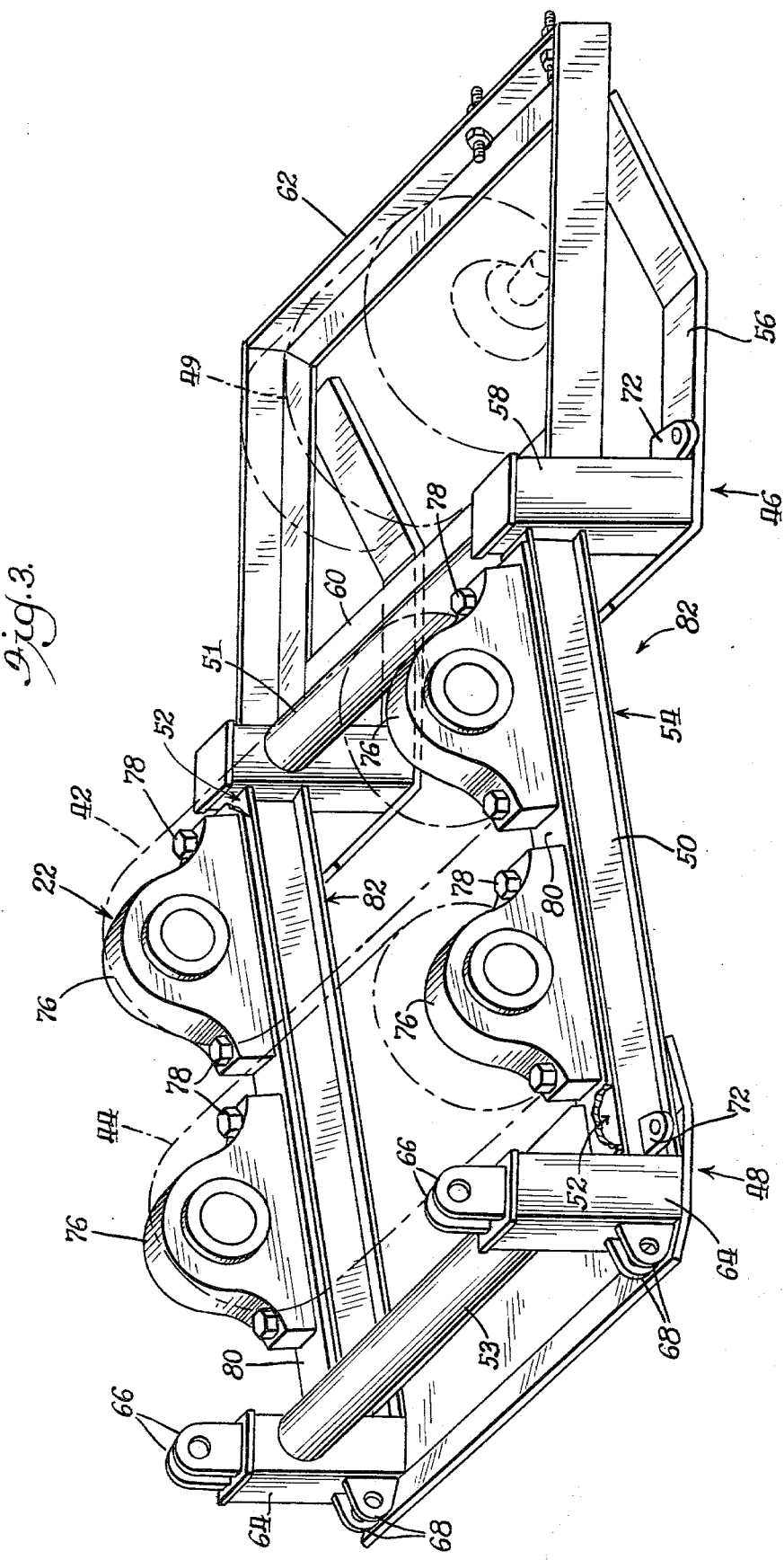
FIG. 3 is a fragmentary perspective view of the drive assembly main frame illustrating an important part of the invention.

The present invention is directed to features of the main frame 22, best shown in FIG. 3. The main frame comprises: separate, ground-engaging foot members 46 and 48 located respectively inbye and outbye of the pair of drive pulleys; and a pair of inclined side frame members 50 illustrated here as I-beams, each with an inclined upper surface 52 and an inclined lower surface 54. Bearing mounting plates 80 of relatively greater precision are attached as by welding to the upper surfaces 52. The inclined lower surfaces 54 are spaced above the ground sufficiently to provide a ground level clean-out access opening 82 on each side to the area beneath the drive pulleys.

Inbye foot member 46 comprises a pair of skids 56 with upstanding inbye posts 58. A rectangular frame consisting of a cross plate 60 and a C-shaped angle bracket 62 is welded together as shown and supports gear motor 49 and one end of the chain drive case 47. A cross strut 51 interconnects the two posts 58 for greater rigidity.

Outbye foot member 48 comprises a single, wide skid 61 extending across the machine. It has a pair of upstanding posts 64, each with a pair of pivot ears 66 at the top and a pair of pivot ears 68 on the lower part of the outbye face. A cross strut 53, similar to 51, interconnects the posts 64. Where possible, rounded or apex upper surfaces are provided, to minimize the accumulation of dust. For example, struts 51 and 53, and comparable cross members 55 in the discharge boom are tubular, and square-cross-section side beams 57 in the boom 24 are oriented with one of the corners at the top to provide two angled upper surfaces 59 on which dust cannot accumulate in any substantial extent.

As shown in FIG. 1, the discharge boom 24 is pivoted for vertical adjustment about pins 65 in ears 66 by means of screw adjustment jacks 70 which are pivoted between ears 68 on the posts and ears 71 on the boom. This is conventional and will not be further described. Foot members 46 and 48 also have apertured, horizontal braces 72 which act as seats to receive the lower ends 74 of roof jacks to hold the drive assembly 20 firmly in place.

The I-beam side members 50 are welded at opposite ends to place them at an angle, in this case about 9° from the horizontal. This angle of course may vary with the requirements of the particular drive assembly, depending on the desired difference in elevation between the drive pulleys 42 and 44, and the spacing between them along the mounting plates 80.

The drive pulleys are rotatably journaled in bearings 76 which are fastened by cap screws 78 to mounting plates 80. As stated, the mounting plates themselves are, in turn, fastened as by welding to the upper surfaces 52 of I-beam members 50.

As stated, it is a characteristic of tandem drive conveyors for the maximum amount of dust to collect on the ground beneath the two drive pulleys, namely in the area marked A in FIG. 1. Unfortunately, the ground area just beneath the drive pulleys is impossible to reach in conventional tandem drive assemblies because the side members and components supported by them close off this entire area from access through the sides.

By contrast, in the present invention, as a result of inclining the side members 50 as described, ground level access openings 82 provide ready access for a scoop or shovel to be inserted conveniently through the side of the head section.

In summary, by fastening one end of the side members 50 to the lower portions of the outbye posts 64, and fastening the opposite ends to the upper portions of the inbye posts 58, a simple and inexpensive means is provided for installing the tandem drive pulleys at the different levels required, and at the same time providing the ground level, side access openings 82 so accumulations of coal dust can be removed from beneath the machine before they become dangerous. And this can be done without shutting the conveyor down for any extended length of time.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

The embodiments of the invention in which an exclusive property or privilege is claimed are defined as follows:

1. In a belt conveyor, a tandem drive assembly for an endless conveyor belt which is orbitally movable along a conveying course, the drive assembly comprising a main frame and an elongated boom at the outbye end of the main frame, a pair of belt drive pulleys mounted in tandem on the main frame and located respectively inbye and outbye of one another and rotatable about spaced parallel axes which are in a first common inclined plane, and a direction-reversing head pulley at the outbye end of the boom, the improvement wherein:
   the main frame comprises separate ground-engaging foot members located respectively inbye and outbye of the pair of drive pulleys and a pair of inclined longitudinal side members interconnecting the foot members at opposite sides of the main frame;
   the foot members having skid means at their bottom ends directly engageable with the ground;
   the inclined side members having upper surfaces which are in a second common inclined plane parallel to the first common inclined plane, and rotary bearings for the drive pulleys being supported on the upper surfaces, the upper surfaces being positioned to support the inbye drive pulley at a higher level than the outbye drive pulley; and
   the inclined side members having lower surfaces elevated above the ground to provide ground level clearance through the sides of the main frame for access to the area beneath the drive pulleys thereby facilitating clean-out of dust and fines deposited there by the conveyor belt.

2. The combination as set forth in claim 1 wherein the inbye and outbye foot members have upright posts on each side of the main frame, each of the side members is connected between a pair of the posts on respective sides of the main frame, and the inbye ends of the side members are connected to posts on the inbye foot members at a higher level than the outbye ends of the side members are connected to the posts on the outbye foot members.

3. The combination as set forth in claim 2 wherein the side members are straight beams with parallel, inclined, upper and lower surfaces.

* * * * *

UNITED STATES PATENT AND TRADEMARK OFFICE
CERTIFICATE OF CORRECTION

PATENT NO. : 4,312,445
DATED : January 26, 1982
INVENTOR(S) : Robert C. Nelson

It is certified that error appears in the above—identified patent and that said Letters Patent is hereby corrected as shown below:

In Fig. 1, add -- A -- and -- 71 -- with lead line as follows:

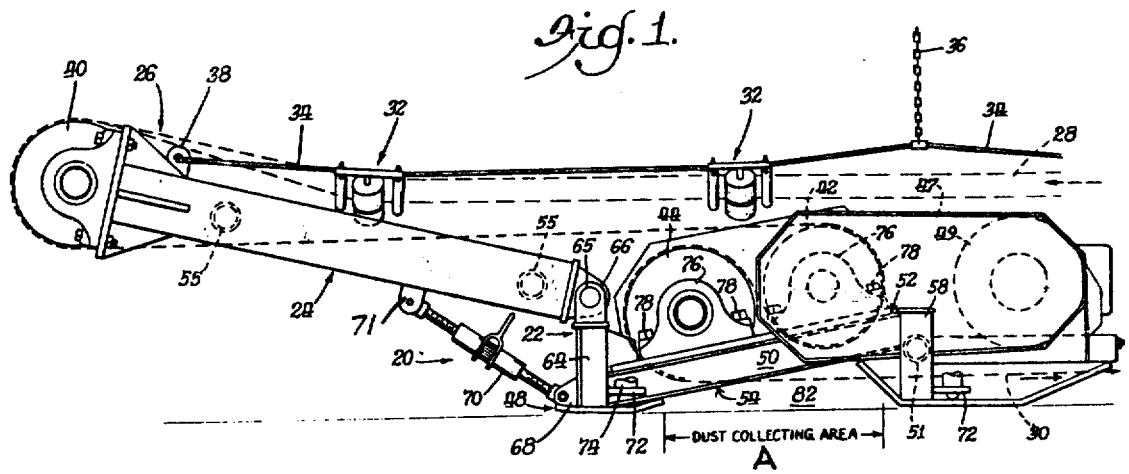

Signed and Sealed this

Fourth Day of May 1982

[SEAL]

Attest:

GERALD J. MOSSINGHOFF

Attesting Officer     Commissioner of Patents and Trademarks